US00RE36930E

United States Patent [19]

Houten et al.

[11] E Patent Number: Re. 36,930

[45] Reissued Date of Patent: Oct. 31, 2000

[54] APPARATUS FOR PROMPTING PEDESTRIANS

[76] Inventors: Ronald Van Houten, 3013 York St. South, Gulfport, Fla. 33707-5657; J. E. Louis Malenfant, 115 Redwood, Pointe du Chein, New Brunswick, Canada, E0A 3G0

[21] Appl. No.: 09/159,350

[22] Filed: Sep. 23, 1998

Related U.S. Patent Documents

Reissue of:

[64] Patent No.: 5,654,705
Issued: Aug. 5, 1997
Appl. No.: 08/708,191
Filed: Sep. 6, 1996

[51] Int. Cl.[7] ..... G08G 1/095

[52] U.S. Cl. ..... 340/944; 340/917; 340/925; 116/63 R; 40/541

[58] Field of Search ..... 340/691, 917, 340/925, 944 OR; 40/541, 553, 557; 116/63 R

[56] References Cited

U.S. PATENT DOCUMENTS

| | | | |
|---|---|---|---|
| Re. 21,818 | 6/1941 | Halstead | 248/353 |
| 1,662,348 | 3/1928 | Stricker | 40/573 |
| 2,130,013 | 9/1938 | Hunter | 340/917 |
| 2,137,719 | 11/1938 | Gray et al. | 246/128 |
| 2,503,574 | 4/1950 | Allen | 40/565 |
| 3,783,446 | 1/1974 | McGimpsey | 340/917 |
| 4,240,063 | 12/1980 | Gould et al. | 340/944 |
| 4,293,841 | 10/1981 | Potter | 340/925 |
| 4,443,783 | 4/1984 | Mitchell | 340/906 |
| 4,704,610 | 11/1987 | Smith et al. | 340/906 |
| 4,736,186 | 4/1988 | Jones | 340/331 |
| 4,775,865 | 10/1988 | Smith et al. | 340/906 |
| 4,843,045 | 6/1989 | Conn, Jr. et al. | 340/906 |
| 4,843,337 | 6/1989 | Conn, Jr. et al. | 340/906 |
| 4,904,998 | 2/1990 | Niimi | 340/908.1 |
| 4,951,045 | 8/1990 | Knapp et al. | 340/944 |
| 4,954,822 | 9/1990 | Borenstein | 340/925 |
| 5,092,705 | 3/1992 | Raswant | 404/1 |
| 5,103,223 | 4/1992 | Humphrey | 340/944 |
| 5,132,683 | 7/1992 | Gould et al. | 340/944 |
| 5,136,287 | 8/1992 | Borenstein | 340/925 |
| 5,150,116 | 9/1992 | West | 340/928 |
| 5,235,329 | 8/1993 | Jackson | 340/902 |
| 5,241,307 | 8/1993 | Bidault et al. | 340/944 |
| 5,249,027 | 9/1993 | Mathur et al. | 356/3.14 |
| 5,406,276 | 4/1995 | Ogle | 340/944 |
| 5,519,390 | 5/1996 | Casini | 340/929 |
| 5,559,509 | 9/1996 | Ogle | 340/944 |
| 5,572,202 | 11/1996 | Regel et al. | 340/944 |
| 5,633,629 | 5/1997 | Hochstein | 340/907 |
| 5,734,339 | 3/1998 | Ogle | 340/944 |

FOREIGN PATENT DOCUMENTS

| | | |
|---|---|---|
| 2704082 | 10/1994 | France . |
| 0216600 | 8/1990 | Japan . |

*Primary Examiner*—Daniel J. Wu
*Attorney, Agent, or Firm*—Howard & Howard

[57] ABSTRACT

An apparatus and a method for prompting pedestrians to look and listen for turning vehicles includes an animated pictorial message formed in the image of a pair of scanning eyes (46,48) and generated by a pedestrian signal control (54) connected to a pedestrian signal display (32). The image (46,48) can be activated by a traffic control (52) or a motion detector (64) connected to the pedestrian signal control (54). A voice circuit (56) and speakers (58) connected to the pedestrian signal control (54) generate an audible message at the same time the image (46,48) is being displayed.

31 Claims, 3 Drawing Sheets

FIG-1
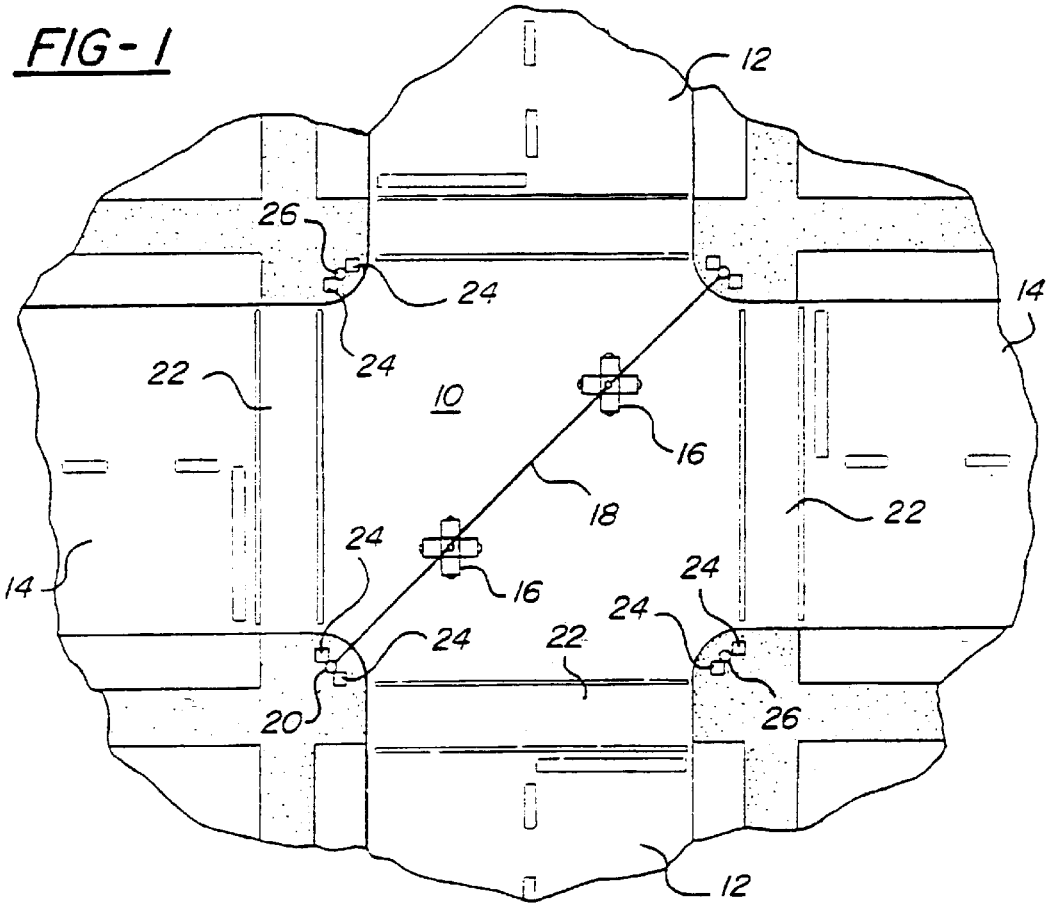
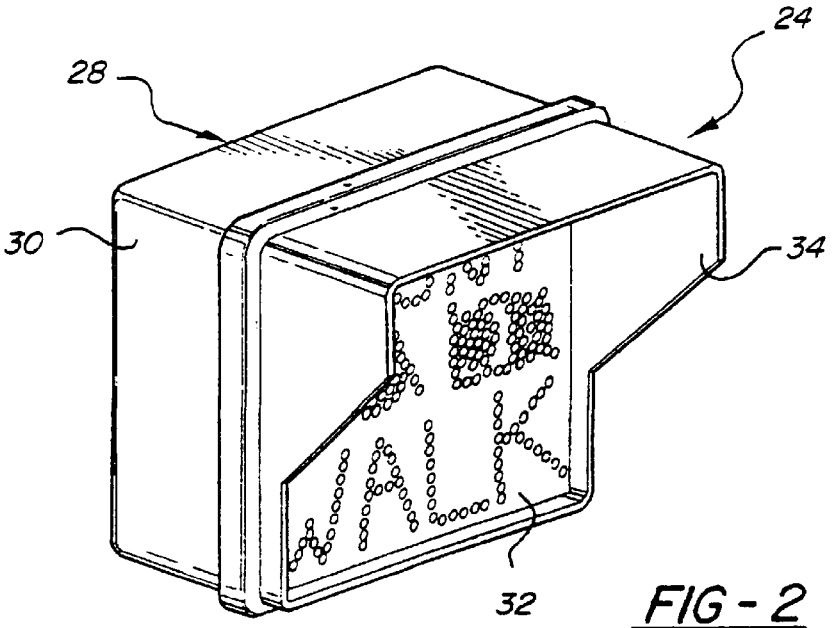
FIG-2

APPARATUS FOR PROMPTING PEDESTRIANS

Matter enclosed in heavy brackets [ ] appears in the original patent but forms no part of this reissue specification; matter printed in italics indicates the additions made by reissue.

BACKGROUND OF THE INVENTION

The present invention relates generally to an apparatus for signaling pedestrian traffic at intersections and, in particular, to an apparatus for prompting pedestrians using crosswalks to look for turning vehicles.

It is general knowledge that turning vehicles kill and injure many pedestrians crossing with the walk signal at signalized intersections. Optical signals, in particular a white pictograph of a walking pedestrian or a red or orange pictograph of an upraised hand, are used to signal whether crossing the road is authorized or prohibited and are in widespread use. In addition, the U.S. Pat. No. 5,241,307 shows a push button operated device which immediately generates red and green figurines when the push button is actuated by a pedestrian and generates an audio message upon activation of the push button for a predetermined time. The audio message prompts blind persons as to whether crossing the road is authorized or prohibited. Some evidence exists that signals indicating that crossing is authorized can give pedestrians a false sense of security and may contribute to vehicle/pedestrian collisions in signalized intersections by decreasing pedestrian visual and auditory observing behavior.

One way to prompt pedestrians to listen and watch for turning vehicles during the time when crossing is authorized is the use of signs located next to the walk button requesting that they be alert to turning vehicles. There are several drawbacks to this approach. One drawback is that not all crosswalks require that a walk button be pressed and, even if it is required, the person can press the button without reading the sign.

No device is known, however, for using a voice and or animated visual message to prompt pedestrians to look for turning vehicles. The present invention has been designed to correct this problem. A variation to this device can also be used to prompt pedestrians to watch for vehicles passing vehicles that have yielded for them at unsignalized marked crosswalks.

Traffic lights have been used for a long time and, they, like automobiles, have gone from being an oddity and a rarity, at the beginning of this century, to being a virtual necessity. At the same time traffic lights have become increasingly complex. Integrating a traffic light into an entire traffic control system has necessitated interconnecting traffic signals electronically to properly coordinate vehicular and pedestrian traffic at specific intersections as well as to properly coordinate vehicle traffic between intersections.

Advertising displays directed to motorists to promote merchants' products and services are, of course, also very common, usually in the form of highway billboards, signage along streets, and store front displays. There are some very good reasons to combine advertising displays with traffic signals. For example, traffic control signals are usually placed at intersections where there is a high volume of vehicular traffic, so advertising at those same intersections would get exposed to many people, usually at times when the people can do little else other than to drive or ride in the vehicle. Revenues from the rental of such advertising space on traffic signals could be put to good use by local governments for road and street improvements or other desirable community improvements or expenditures. There may also be some very real benefits in providing advertising displays to occupy drivers' minds and attentions to decrease boredom and irritability while they wait at red lights or are stalled in congested traffic.

Unfortunately, there are also some safety concerns, as well as practical considerations, that have thus far prevented any widespread or even minimal general use of advertising displays in conjunction with traffic signals. One of the most significant safety problems is that the advertising displays could tend to divert drivers' attentions from the traffic control signals and from observing surrounding vehicular and pedestrian traffic at busy intersections when their utmost attention to their driving is needed to avoid traffic congestion and even possible accidents. Also, the physical locations of many traffic signals adjacent, and often over, busy streets and walkways presents a problem in changing the advertising displays during normal business hours without impeding the flow of traffic.

There are a few examples of earlier attempts to combine advertising displays with traffic signals, which have never attained any significant use, probably because they did not solve the safety and practical problems discussed above. For example, the U.S. Pat. No. 1,662,348 shows a large, framed, box-like mounting structure that contains both a set of red, amber, and green traffic signal lights and an illuminated advertising display. The advertising display portion of this apparatus includes a semi-transparent surface mask or screen having advertising printed thereon along with a set of back lights to illuminate the advertising mask or screen from behind. Stricker apparently tried to minimize the problem of diverting drivers' attentions from the stop, go, and caution messages intended to be conveyed by the conventional red, green, and amber traffic lights by providing corresponding red, green, and amber back lighting for illuminating his advertising displays. Unfortunately, such color-coordinated backlighting still presented the advertising to the drivers at all times.

While the U.S. Pat. No. 2,503,574, shows an advertising display that is positioned in sidewalk curbs rather than adjacent the vehicular traffic control lights, such a display presents the same kind of problem to both pedestrians and to drivers who are in a position to see the display. In fact, this device really exacerbates the safety problem, because it combines and makes the "STOP" and "GO" signals integral parts with the advertising message. Such a combination could actually confuse people and camouflage the intended traffic control message in the advertising message, thus, losing, or at least diluting, the crisp significance of the traffic control message.

The U.S. Pat. No. 5,150,116 shows a traffic light timed advertising center including an advertising display device, such as an electronic message center or other visual display device for displaying alpha-numeric and symbolic advertising messages, in which the advertising messages can be made selectively visible and invisible to drivers, is positioned adjacent a traffic control signal device having alternative signal phases for sequentially stopping and permitting the flow of traffic. A display control device, including an electronic control signal, coordinates the advertising display device with the traffic control signal device to make the advertising message invisible to drivers at selected times, particularly during transitions of the traffic control signal device from one signal phase to another, during a particular phase, and for predetermined time intervals before or after the transition from one phase to another, as desired or appropriate to display the advertising message only during times of the traffic control signal device phases when drivers' attentions to the advertising message will not adversely affect the drivers' attentions to required driving functions.

As stated above, optical signaling for pedestrians, in particular with the help of green or red figurines indicating whether the crossing of a road is authorized or forbidden, is well known today. In some countries, the figurines are replaced by the indications "Walk" and "Don't Walk". In order that blind persons may benefit from a sound signaling, the latter must include a sound device. Such a device is shown in the French Patent Application FR-A-2 627 882. It includes a loud speaker activated by an ultrasonic receiver which is arranged for receiving an ultrasonic request signal transmitted from a remote control housing with a push button. When this remote control housing push button is activated, the ultrasonic request signal is stored while waiting for a green figurine for pedestrians to appear, which launches the transmission of an audible message.

Such a device, of course, brings the advantage that the sound signaling is operated only upon request and not continuously, which could trouble the neighborhood because of an infinite repetition of the same crossing authorization and forbidding messages. On the other hand, this device has the disadvantage of being relatively expensive, especially if each blind person is provided with his own remote control housing. In addition, it seems difficult for a single four road crossing or a more complex one to forecast which crossing the pedestrian intends to undertake. The situation will be even more complicated if several blind persons simultaneously arrive at the same crossing.

Sound signaling and optical signaling at a crosswalk both can be activated by a single push button as shown in the U.S. Pat. No. 5,241,307. An activation of optical signaling, such as green and red figurines is immediate, whereas the transmission of a sound message authorizing or forbidding a crossing is activated only when the pedestrian pushes the button for a predetermined time. The generation device for sound signals is controlled by a microprocessor including logic and analog inputs and outputs, the messages being stored in digital form and transmitted according to the ADPCM method.

Pedestrian traffic as well as automobile traffic makes use of intersections in urban and suburban streets. As pedestrians travel from one location in a city to another, they are faced with many intersections which must be crossed. In order to assist the pedestrians in crossing safely, the familiar "WALK" and "DON'T WALK" signs are linked to standard motor-traffic controls. This allows pedestrians to, ideally, cross with, rather than against, the flow of automobile traffic. While these controls, i.e. the "WALK" and "DON'T WALK" signs, warn pedestrian traffic of the safest opportunity to cross the intersection, they do not prevent a pedestrian from crossing against the light, i.e. entering the intersection when oncoming traffic has a "green light".

Also many urban areas and resort areas that have an especially heavy flow of pedestrian traffic have non-intersection crosswalks, i.e. crosswalks between intersections in which pedestrians always have the right of way. There are presently no warning light systems that warn oncoming traffic that a pedestrian is attempting to cross against the light or has entered a non-intersection crosswalk and is presently in the crosswalk. This need is most acute during periods of poor visibility when an alert driver would experience difficulty in spotting pedestrians.

The U.S. Pat. No. 5,406,276 shows a crosswalk warning light system for warning drivers that a pedestrian has entered a crosswalk by shining a light, preferably a laser, having a beam parallel to the crosswalk. The crosswalk warning light system detects a pedestrian entering the crosswalk and activates a light that is aimed across the intersection, thus the driver sees this beam of light, which is projected across the intersection and is warned of the presence of a pedestrian in the crosswalk. The crosswalk warning light system is timed so as to deactivate the light after a predetermined interval of time. In the preferred embodiment, a first and an adjacent laser are spaced apart a distance substantially the width of the crosswalk, provide parallel beams of light on each side of the crosswalk. Also in the preferred embodiment, a second laser, disposed at the opposite end of the crosswalk, provides a second beam of light, aimed substantially co-linearly with the first. This allows at least a partial beam of light at each end of the crosswalk in the event a pedestrian blocks the first laser beam.

Obviously, the "WALK" indication means that there may or may not be possible conflict of pedestrians with turning vehicles. However, much evidence suggests that pedestrians do not consistently look for conflicts with turning vehicles. For example, the over representation of left turning vehicles in pedestrian collisions in crosswalks at signalized intersections has been carefully documented by researchers (Habib, 1980; Quaye, Leden and Hauer, 1993). Quaye et al. speculated that these types of crashes may be related to the low level of observing behavior exhibited by pedestrians using crosswalks with traffic and pedestrian signals.

Van Houten and Malenfant (1995) found that serious motor vehicle pedestrian conflicts occur:

infrequently for vehicles turning right on red, at a moderate frequency for vehicles turning right on green, and at a very high frequency for vehicles turning left on green.

In fact, conflicts with vehicles turning left on green were more numerous than conflicts with vehicles turning right on green and right on red combined. These data are in accord with the data published by others showing that left turning vehicles are over represented in pedestrian collisions at crosswalks. When Van Houten and Malenfant examined pedestrian observing behavior relative to the location of turning vehicles, they found the percentage of pedestrians looking for turning vehicles was highest for vehicles starting their turn ahead of the pedestrian, lower for vehicles starting their turn beside the pedestrian, and lowest for vehicles starting their mm behind the pedestrian. These data showed that there is a strong inverse relationship between the occurrence of motor vehicle pedestrian conflicts and the level of pedestrian observing behavior.

Van Houten and Malenfant also found that signs requesting pedestrians to look for turning vehicles erected next to the pedestrian signal head, or a similar message painted in the crosswalk, produced enduring increases in the percentage of pedestrians looking for all threats and almost eliminated conflicts between pedestrians and turning vehicles. Similar reductions were also reported by Van Houten, Malenfant, Van Houten, and Retting (1995) using a digitally recorded verbal message played at the start of the "WALK" phase prompting pedestrians to look for mining vehicles. The reductions in conflict frequency reported in these studies takes on considerable significance given the high correlation between this type of conflict and the incidence of pedestrian crashes (Lord, 1994).

Although the use of paint and signs prompting pedestrians to look for turning vehicles has been shown to be effective in reducing conflicts with turning vehicles, and may be warranted and appropriate at certain intersections, the wide scale implementation and maintenance of these prompts would increase the workload of highway engineers, would lead to the proliferation of signs, and would prove costly in the long run.

SUMMARY OF THE INVENTION

The present invention concerns an apparatus for prompting pedestrians at a crosswalk including a first look visual indicator means responsive to a first control signal for displaying a first image of a pair of left looking eyes, a second look visual indicator means responsive to a second control signal for displaying a second image of a pair of right looking eyes, a don't walk visual indicator means responsive to a third control signal for displaying a third image representing a don't walk message, a walk visual indicator means responsive to fourth control signal for displaying a fourth image representing a walk message, and a control means connected to the visual indicator means for generating the first through fourth control signals. The control means causes the don't walk visual indicator means to flash the third image to prompt a pedestrian that the don't walk message is about to be displayed and to steadily display the third image to prompt the pedestrian not to enter a crosswalk, causes the walk visual indicator means to display the fourth image to prompt a pedestrian to enter the crosswalk, and causes the first and second look visual indicator means to alternately display the first and second images to prompt the pedestrian to look for turning vehicles. The first and second control signals are generated in response to a traffic signal status signal generated by a traffic control or in response to a pedestrian detection signal generated by a motion detector for detecting pedestrians. The control means generates an audio signal and an audio means connected to the control means is responsive to the audio signal for delivering an audible warning message to prompt the pedestrian to look for turning vehicles during generation of the first and second control signals.

The present invention also concerns a method of prompting pedestrians at a crosswalk comprising the steps of: a. generating a first image of a pair of left looking eyes; b. generating a second image of a pair of right looking eyes; and c. cyclically performing the steps a. and b. alternately during a predetermined time period to prompt a pedestrian at a crosswalk to look for vehicles. The method further includes a step of generating a walk image to prompt the pedestrian to enter the crosswalk after performing the step c. and a step of generating a don't walk image to prompt the pedestrian not to enter the crosswalk before performing the step c. The step c. includes generating an audible message to prompt a pedestrian at the crosswalk to look for vehicles and performing the step c. in response to a traffic signal status signal generated by a traffic control or in response to a pedestrian detection signal generated by a motion detector.

A primary purpose of the present invention is to reduce pedestrian-motor vehicle collisions in crosswalks. More specifically, the present invention relates to increasing the probability that pedestrians will avoid collisions with turning vehicles in signalized and unsignalized crosswalks, thereby increasing their safety. The present invention prompts pedestrians to look and listen for mining vehicles at the start of the pedestrian walk signal by auditory and or visual means at signalized intersections, and prompts pedestrians to watch for vehicles passing yielding vehicles in adjacent lanes at unsignalized intersections by auditory means.

An object of the present invention is to prompt pedestrians to look for turning vehicles while they cross with the pedestrian walk signal.

It is also an object of the present invention to make such a prompting device compatible with the standard traffic controller boxes presently in use at signalized crosswalks.

Another objective of the present invention is to establish the visual and auditory messages as conditioned reinforcers for pedestrians by arranging for the prompting message to come on within 0.1 seconds and 0.8 seconds prior to the start of the conventional walk signal.

A further objective of the present invention is to prime pedestrians to respond to peripheral visual and auditory stimuli associated with turning vehicles in order to reduce the incidence of motor vehicle pedestrian conflicts and pedestrian crashes in crosswalks when the walk signal is present.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a plan view of a roadway intersection having traffic signals, crosswalks and pedestrian signals, the pedestrian signals including an apparatus for prompting pedestrians in accordance with the present invention;

FIG. 2 is perspective view of the head of one of the pedestrian signals shown in the FIG. 1;

DESCRIPTION OF THE PREFERRED EMBODIMENT

Figure 3:
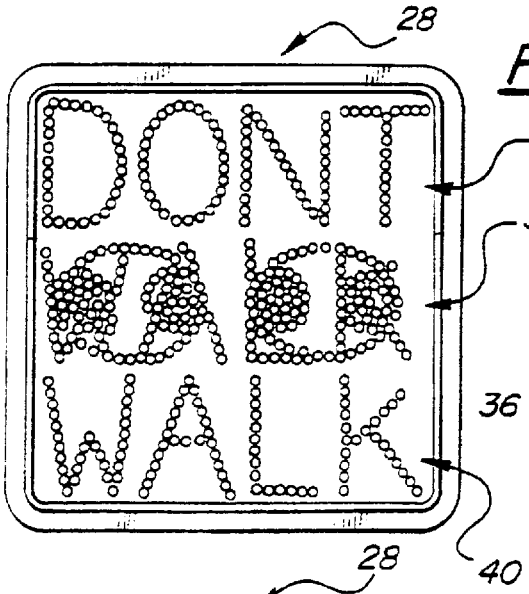
FIG. 3 is a front elevation view of the pedestrian signal head shown in the FIG. 2.

There is shown in the FIG. 1 a roadway intersection 10, in plan view, including a north/south roadway 12 intersecting with an east/west roadway 14. Vehicular traffic at the intersection 10 is controlled by a pair of traffic signals 16 which are typically suspended above the road surface on a cable 18 stretched between a pair of poles 20 located at diametrically opposed corners of the intersection. Pedestrian traffic at the intersection 10 is directed from corner to corner along crosswalks 22 which are typically delineated by lines painted on the roadways 12 and 14. Mounted on each of the poles 20 is a pair of pedestrian signals 24 each facing an associated one of the crosswalks 22. In a similar fashion, a pair of poles 26 are provided on the other two corners each having a pair of the pedestrian signals 24 mounted thereon. Therefore, a pedestrian entering any one of the four crosswalks 22 will be facing one of the pedestrian signals 24.

Figure 4:
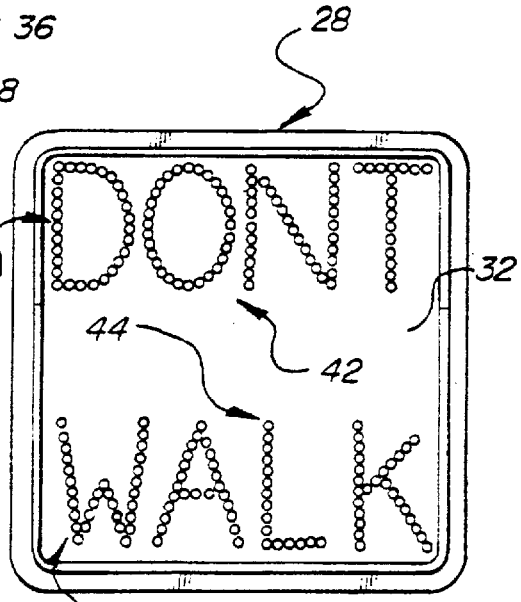
FIG. 4 is a view similar to the FIG. 3 displaying a "DON'T WALK" message.

A head 28 of one of the pedestrian signals 24 is shown in the FIG. 2 as including a generally box shaped housing 30 with a display 32 forming a front face thereof and a shade 34 surrounding the display. The display 32 consists of a plurality of light emitting diodes (LEDs) mounted behind a lens which is at least partially transparent. As shown more clearly in the FIG. 3, the display 32 is divided into three generally equal size rectangular areas, an upper area 36, a central area 38 and a lower area 40. In the upper area 36, there is a plurality of LEDs 42 which LEDs are arranged to form a visual image or symbol to display the word "DON'T" as a first portion of a don't walk message. In the lower area 40 of the display 32, there is a plurality of LEDs 44 which LEDs are arranged to form a visual image or symbol to display the word "WALK" as a second portion of the don't walk visual message. Thus, the LEDs 42 and 44 can be turned on to display a "DON'T WALK" message as shown in the FIG. 4 to a pedestrian facing the display 32.

In the central area 38 of the display 32, there are three pluralities of LEDs for displaying three additional messages. As shown in the FIG. 5, there is a plurality of LEDs 46 which LEDs are arranged to form visual image or symbol to display a pair of left looking eyes as a visual message representing "LOOK RIGHT". Thus, when the LEDs 46 are lighted, the resulting symbol conveys a message to facing pedestrians to look to the right for turning vehicles. As shown in the FIG. 6, there is a plurality of LEDs 48 which LEDs are arranged to form a visual image or symbol to display a pair of right looking eyes as a visual message representing "LOOK LEFT". Thus, when the LEDs 48 are lighted, the resulting symbol conveys a message to facing pedestrians to look to the left for turning vehicles. As shown in the FIG. 7, there is a plurality of LEDs 50 which LEDs are arranged to form visual image or symbol to display the word "WALK" as a visual walk message. Thus, when the LEDs 50 are lighted, the resulting symbol conveys a walk message to facing pedestrians to enter the crosswalk 22.

Traffic controllers are built using the NEMA (North American Electrical Manufacturer's Association) TS1 or TS2 standards. These standards define all operations of the controller, including communications and interconnections with all other devices in a complete system. The standards provide for a connection that indicates which traffic light is on, and what color. The binary signal levels for such a connection are defined to be 0 Volts DC (True) and 24 Volts DC (False). These traffic signal status signals are employed to actuate the warning messages in pedestrian signals and can be used in the pedestrian prompting apparatus according to the present invention.

Figure 8:
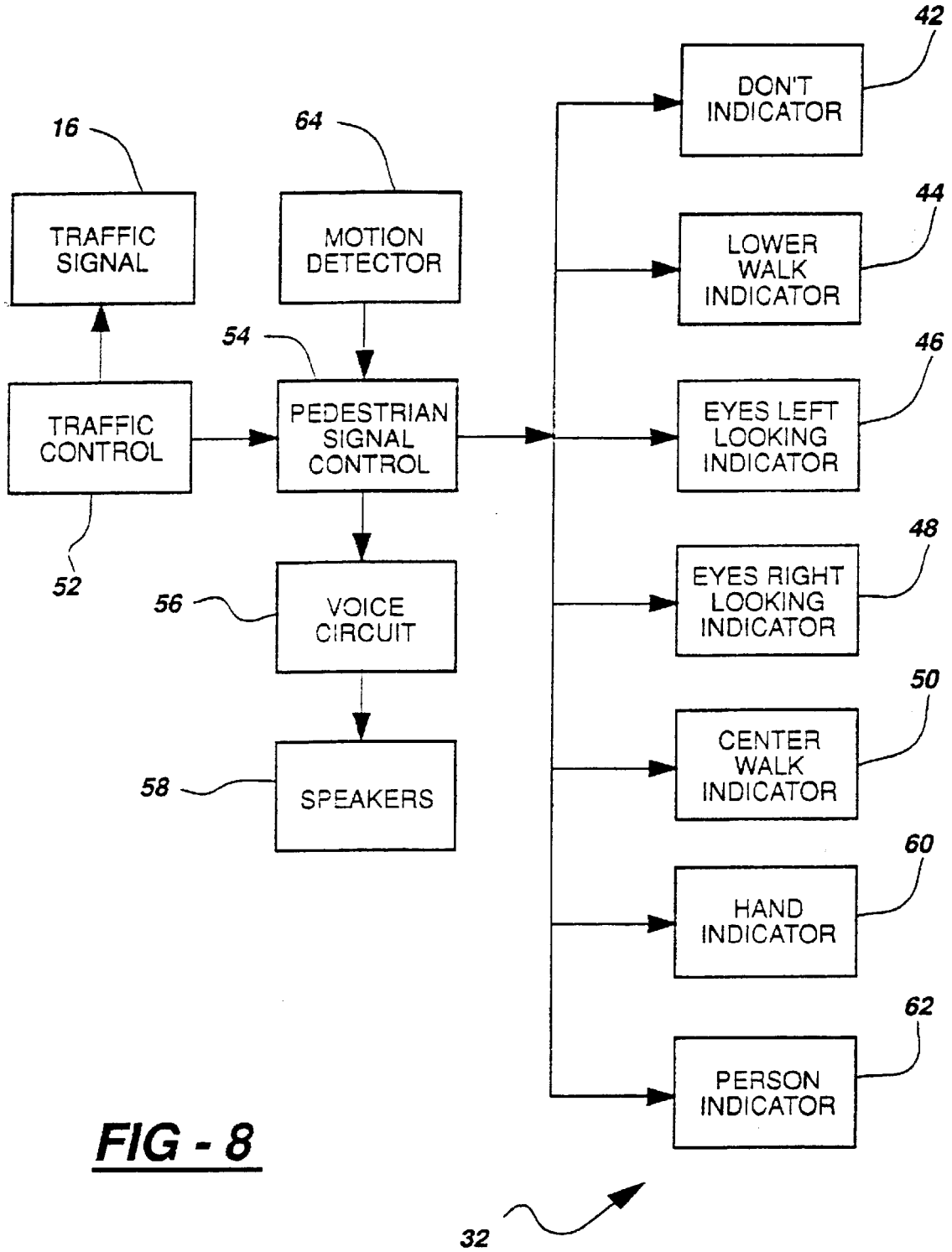
FIG. 8 is a schematic block diagram of the control system for the apparatus according to the present invention.

There is shown in the FIG. 8 a schematic block diagram of a control system for the apparatus according to the present invention. A standard traffic controller 52 has a first output connected to one or more of the standard traffic signals 16 for controlling traffic at an intersection. The controller 52 has a second output connected to a first input of a pedestrian signal control 54 to provide the traffic signal status signals defined above. The pedestrian signal control 54 has a first output connected to inputs of a plurality of individual indicators which form the pedestrian signal display 32. Included in the display 32, and connected to the pedestrian signal control 54, are the "DON'T" symbol indicator 42, the lower "WALK" symbol indicator 44, the left looking eyes indicator 46, the right looking eyes indicator 48 and the center "WALK" symbol indicator 50. The pedestrian signal control responds to the traffic signal status signals to generate control signals to the display 32 to activate the appropriate indicators in coordination with the traffic signal 16.

Voice recording and playback ability is provided by a voice circuit 56 having an input connected to a second output of the pedestrian signal control 54. The voice circuit 56 can include a circuit board using an audio chip made by OKI. The board has a 20-pin interface so that it can be controlled by an outside source such as the pedestrian signal control 54. The sound output of the OKI board is amplified to drive four speakers, one set up at each corner of an intersection controlled by a traffic signal, and two speakers at intersections not controlled by a traffic signal. Thus, an output of the voice circuit 56 is connected to an input of a set of speakers 58 to generate an audio signal which drives the speakers to deliver an audible warning message to prompt pedestrians. The system is designed to withstand temperature extremes ranging from −30° C. to +40° C.

Although the groups of LEDs 42, 44 and 50 have been described in terms of the verbal messages "DON'T WALK" and "WALK", many pedestrian signals utilize images of a silhouette of an upraised hand in an orange color and a silhouette of a walking person in a white color to convey the respective messages. Accordingly, the silhouette of the hand can be provided in the upper area 36 of the display 32 and the silhouette of the walking person can be provided in the lower area 40 while the central area 38 contains the symbols 46 and 48. As shown in the FIG. 8, an input of a hand indicator 60 and an input of a person indicator 62 can be connected to the output of the pedestrian signal control 54 to receive the appropriate control signals.

The pedestrians also can be prompted to look for vehicles that pass stopped vehicles at crosswalks that are not controlled by a traffic signal, or are controlled by a pedestrian activated flashing amber light. Such an auditory message is generated by the voice circuit 56 and the speakers 58 when a pedestrian activates a motion detector 64 by stepping up to the curb adjacent to the crosswalk. The motion detector 64 has an output connected to an input of the pedestrian signal control 54 for generating a pedestrian detection signal.

The visual warning message conveyed by the eyes symbol indicators 46 and 48 prompts pedestrians to look for mining vehicles at the start of the "WALK" phase of the pedestrian signal display 32. Animation is accomplished by rapidly alternating between activation of the image of the eyeballs at the right sides of the eyes represented by the indicator 48 and the image of the eyeballs at the left sides of the eyes represented by the indicator 46. In the preferred embodiment, these images can consist of two blue color eyes with blue eyeballs that scan left and right at a rate of approximately two cycles per second for a period of three seconds at the start of the "WALK" phase. This pictographic signal can be constructed from blue (460 nm) LEDs with an 8° field of view so that the images would be visible to pedestrians but not motorists. The "WALK" image can be the word indicator 50 or a person pictograph constructed from blue LEDs with an 8° degree field of view. The DON'T WALK image can consist of the word indicators 42 and 44 or a hand pictograph constructed from portland orange (605 nm) LEDs with an 8° field of view. The use of LEDs with a narrow field of view would make the messages highly visible to pedestrians and restrict the visibility of the messages to motorists, thereby selectively delivering the messages to the target population.

The design of the pedestrian signal head 28 typically would comply with the following standards:

1. The pedestrian signal display 32 is rectangular in shape and the symbols are at least 9 inches high.

2. The "DON'T WALK" message indicator is steadily illuminated and consists of words 42 and 44 or an upraised hand 60 illuminated by orange (605 nm) LEDs on a black background.

3. The "LOOK" message (scanning eyes) indicators 46 and 48 consist of blue (460 nm) LEDs steadily illuminating eyes with blue eyeballs that scan from side to side. The eyeballs scan from left to right at a rate of two cycles per second. The "LOOK" message is generated within 0.1 seconds to 0.8 seconds prior to the start of the "WALK" message.

4. The "WALK" message indicator is steadily illuminated and consists of a word 50 or a walking person 62 illuminated by blue (460 nm) LEDs on a black background.

5. The "DON'T START" message consists of flashing the "DON'T WALK" message.

Figure 5:
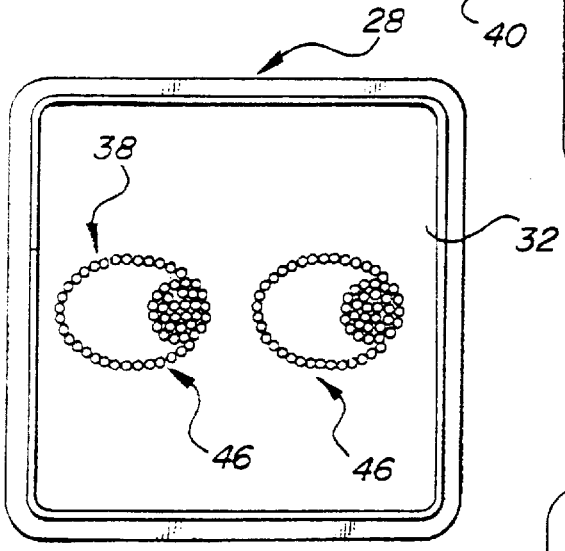
FIG. 5 is a view similar to the FIG. 3 displaying a "LOOK RIGHT" message.
Figure 6:
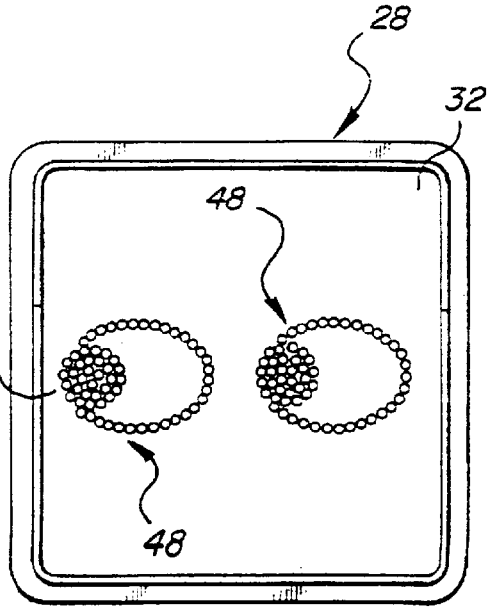
FIG. 6 is a view similar to the FIG. 3 displaying a "LOOK LEFT" message.
Figure 7:
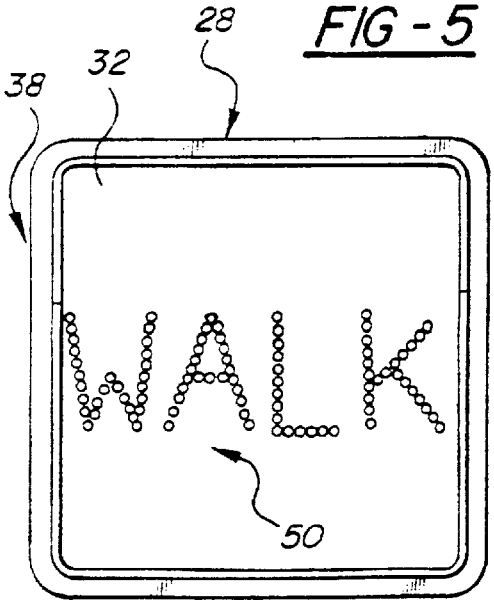
FIG. 7 is a view similar to the FIG. 3 displaying a "WALK" message.

As shown in the FIG. 5 and the FIG. 6, the preferred method of visually prompting pedestrians to be aware of turning vehicles on a potential collision course at crosswalks controlled by a traffic signal is to present a warning message that consists of the image of two eyes 46 and 48 with the eyeballs moving back and forth between left and right for several seconds prior to the initiation of the standard walk signal. The preferred way to auditorially prompt pedestrians to be aware of vehicles on a potential collision course is to provide a spoken message through the speakers 58 warning them to look for turning vehicles. The preferred method of auditorially prompting pedestrians to be aware of vehicles that pass stopped vehicles at crosswalks that are not controlled by a traffic signal, or are controlled by a pedestrian activated flashing amber light, is to provide an auditory message when the pedestrian activates the motion detector 64 by stepping up to the curb adjacent to the crosswalk.

The pedestrian signal control 54 can be installed in the box for the traffic control 52 and activated by the drop in logic voltage initiated at the start of the all red traffic signal condition, such that the start of the all red condition initiates a timer incorporated as part of the invention. The timer is adjustable so that the onset of the auditory and or visual message warning pedestrians to look for turning vehicle occurs between 0.1 and 0.8 seconds prior to the start of the message authorizing crossing. The messages are provided on all light changes because many pedestrians do not press the pedestrian button, and lights are frequently operated on fixed timer, or by loop detectors that detect the presence of vehicles on the side street. Because the signal is provided on every light change, a feedback loop may be employed to use the ambient sound level at the intersection to regulate the output volume of the speakers.

In summary, the present invention includes an apparatus for prompting pedestrians including: a first visual indicator means 46 responsive to a first control signal for displaying a first image of a pair of left looking eyes; a second visual indicator means 48 responsive to a second control signal for displaying a second image of a pair of right looking eyes; and a control means 54 connected to the first and second visual indicator means 46,48 for alternately generating the first and second control signals whereby the first and second visual indicator means alternately display the first and second images to prompt a pedestrian to look for turning vehicles. The control means 54 generates the first and second control signals to cause the first and second images to be alternately displayed at a rate of approximately two cycles per second. The first and second visual indicators 46,48 can be illuminated by blue (460 nm) LEDs.

The apparatus includes a don't walk visual indicator means 42,44,60 responsive to a third control signal for displaying a don't walk message to the pedestrian, the control means 54 being connected to the don't walk visual indicator means for generating the third control signal. The don't walk visual indicator means 42,44,60 can be illuminated by orange (605 nm) LEDs on a black background. The don't walk visual indicator means 42,44 is formed as a pair of words "DON'T WALK" and the don't walk visual indicator means 60 is formed as an upraised hand. The apparatus includes a walk visual indicator means 50,62 responsive to a fourth control signal for displaying a walk message to the pedestrian, the control means 54 being connected to the walk visual indicator means for generating the fourth control signal. The walk visual indicator means 50,62 can be illuminated by blue (460 nm) LEDs on a black background. The walk visual indicator means 50 is formed as a word "WALK" and the walk visual indicator means 62 is formed as a walking person.

The control means 54 generates an audio signal and the apparatus includes audio means 56,58 connected to the control means and being responsive to the audio signal for delivering an audible warning message to prompt a pedestrian to look for turning vehicles. The apparatus also can include a traffic signal control 52 having an output connected to an input of the control means 54 for generating traffic signal status signals whereby the control means responds to the traffic signal status signals to generate the first and second control signals in coordination with a traffic signal 16 connected to the traffic signal control. The apparatus can include a motion detector 64 having an output connected to an input of the control means 54 for generating a pedestrian detection signal upon sensing an adjacent pedestrian whereby the control means responds to the pedestrian detection signal to generate the first and second control signals.

The present invention also includes a method of prompting pedestrians at a crosswalk including the steps of: a. generating the first image 46 of a pair of left looking eyes; b. generating the second image 48 of a pair of right looking eyes; and c. cyclically performing the steps a. and b. alternately during a predetermined time period to prompt a pedestrian at the crosswalk 22 to look for vehicles. The method also includes a step of generating the walk image 50,62 to prompt the pedestrian to enter the crosswalk 22 after performing the step c. and the step of generating the don't walk image 42,44,60 to prompt the pedestrian not to enter the crosswalk before performing the step c. The step c. can include generating an audible message to prompt a pedestrian at the crosswalk 22 to look for vehicles and performing the step c. in response to a traffic signal status signal generated by a traffic control 52 or in response to a pedestrian detection signal generated by a motion detector 64.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for prompting pedestrians comprising:

a first visual indicator means (46) responsive to a first control signal for displaying a first image of a pair of left looking eyes;

a second visual indicator means (48) responsive to a second control signal for displaying a second image of a pair of right looking eyes; and a control means (54) connected to said first and second visual indicator means (46,48) for alternately generating said first and second control signals whereby said first and second visual indicator means alternately display said first and second images to prompt a pedestrian to look for turning vehicles.

2. The apparatus according to claim 1 wherein said control means (54) generates said first and second control signals to cause said first and second images to be alternately displayed at a rate of approximately two cycles per second.

3. The apparatus according to claim 1 wherein said first and second visual indicators (46,48) are illuminated by blue (460 nm) LEDs.

4. The apparatus according to claim 1 including a don't walk visual indicator means (42,44,60) responsive to a third control signal for displaying a don't walk message to the pedestrian, said control means (54) being connected to said don't walk visual indicator means for generating said third control signal.

5. The apparatus according to claim 4 wherein said don't walk visual indicator means (42,44,60) is illuminated by orange (605 nm) LEDs on a black background.

6. The apparatus according to claim 4 wherein said don't walk visual indicator means (42,44) is formed as a pair of words "DON'T WALK".

7. The apparatus according to claim 4 wherein said don't walk visual indicator means (60) is formed as an upraised hand.

8. The apparatus according to claim 1 including a walk visual indicator means (50,62) responsive to fourth control signal for displaying a walk message to the pedestrian, said control means (54) being connected to said walk visual indicator means for generating said fourth control signal.

9. The apparatus according to claim 8 wherein said walk visual indicator means (50,62) is illuminated by blue (460 nm) LEDs on a black background.

10. The apparatus according to claim 8 wherein said walk visual indicator means (50) is formed as a word "WALK".

11. the apparatus according to claim 8 wherein said walk visual indicator means (62) is formed as a walking person.

12. The apparatus according to claim 1 wherin said control means generates an audio signal and including audio means (56,58) connected to said control means (54) and being responsive to said audio signal for delivering an audible warning message to prompt a pedestrian to look for turning vehicles.

13. The apparatus according to claim 1 including a traffic signal control (52) having an output connected to an input of said control means (54) for generating traffic signal status signals whereby said control means responds to said traffic signal status signals to generate said first and second control signals in coordination with a traffic signal (16) connected to said traffic signal control.

14. The apparatus according to claim 1 including a motion detector (64) having an output connected to an input of said control means (54) for generating a pedestrian detection signal upon sensing an adjacent pedestrian whereby said control means responds to said pedestrian detection signal to generate said first and second control signals.

15. An apparatus for prompting pedestrians at a crosswalk comprising:

a first look visual indicator means (46) responsive to a first control signal for displaying a first image of a pair of left looking eyes;

a second look visual indicator means (48) responsive to a second control signal for displaying a second image of a pair of right looking eyes;

a don't walk visual indicator means (42,44,60) responsive to a third control signal for displaying a third image representing a don't walk message;

a walk visual indicator means (50,62) responsive to a fourth control signal for displaying a fourth image representing a walk message; and a control means (54) connected to said visual indicator means (42,44,46,48,50,60,62) for generating said third control signal whereby said don't walk visual indicator means (42,44,60) flashes said third image to prompt a pedestrian that said don't walk message is about to be displayed and steadily displays said third image to prompt the pedestrian not to enter a crosswalk (22), for generating said fourth control signal whereby said walk visual indicator means (50,62) displays said fourth image to prompt a pedestrian to enter the crosswalk, and for alternately generating said first and second control signals whereby said first and second look visual indicator means alternately display said first and second images to prompt the pedestrian to look for turning vehicles.

16. The apparatus according to claim 1 wherein said control means generates an audio signal and including audio means (56,58) connected to said control means (54) and being responsive to said audio signal for delivering an audible warning message to prompt a pedestrian to look for turning vehicles during generation of said first and second control signals.

17. A method of prompting pedestrians at a crosswalk comprising the steps of:

a. generating a first image (46) of a pair of left looking eyes;

b. generating a second image (48) of a pair of right looking eyes; and c. cyclically performing said steps a. and b. alternately during a predetermined time period to prompt a pedestrian at a crosswalk (22) to look for vehicles.

18. The method according to claim 17 including a step of generating a walk image (50,62) to prompt a pedestrian to enter the crosswalk (22) after performing said step c.

19. The method according to claim 17 including a step of generating a don't walk image (42,44,60) to prompt a pedestrian not to enter the crosswalk (22) before performing said step c.

20. The method according to claim 17 wherein said step c. includes generating an audible message to prompt a pedestrian at a crosswalk (22) to look for vehicles.

21. The method according to claim 17 including performing said step c. in response to a pedestrian detection signal generated by a motion detector (64).

22. The method according to claim 17 including peforming said step c. in response to a pedestrian detection signal generated by a motion detector (64).

*23. An apparatus for prompting comprising:*

*a first visual indicator means (46) responsive to a first control signal for displaying a first image of a pair of eyes looking in a first direction;*

*a second visual indicator means (48) responsive to a second control signal for displaying a second image of a pair of eyes looking in a second direction; and*

*a control means (54) connected to said first and second visual indicator means (46, 48)* for generating said first and second control signals whereby said first and second visual indicator means display one of said first and second images at a time to prompt a person to look in one of said first and second directions.

*24. The apparatus according to claim 23 wherein said control means generates an audio signal and including audio means (56,58) connected to said control means (54) and being responsive to said audio signal for delivering an audible warning message to prompt a person to look in one of said first and second directions.*

*25. The apparatus according to claim 23 including a traffic signal control (54) having an output connected to an input of said control means (54) for generating traffic signal status signals whereby said control means responds to said traffic signal status signals to generate said first and second control signals in coordination with a traffic signal (16) connected to said traffic signal control.*

*26. The apparatus according to claim 23 including a motion detector (64) having an output connected to an input of said control means (54) for generating a detection signal upon sensing an adjacent object whereby said control means responds to said detection signal to generate said first and second control signals.*

*27. The apparatus according to claim 23 including a visual image for conveying an additional message.*

*28. A method of prompting a person to look in one of first and second directions comprising the steps of:*

*generating a first image (46) of a pair of eyes looking in the first direction;*

*generating a second image (48) of a pair of eyes looking in the second direction; and*

*successively performing above steps to prompt a person to look in the first and second directions respectively.*

*29. The method according to claim 28 including generating a traffic status signal from traffic, generating the images in response to the traffic status signal.*

*30. The method according to claim 28 including detecting motion and generating said images in response to the motion.*

*31. The method according to claim 28 including generating a secondary visual image for conveying an additional message.*

* * * * *